Sept. 1, 1942.    E. C. THOMSEN    2,294,637
COUPLING NUT
Filed July 5, 1940

INVENTOR.
Ewald C. Thomsen
BY Clarence E. Threedy
HIS ATTORNEY.

Patented Sept. 1, 1942

2,294,637

UNITED STATES PATENT OFFICE 2,294,637

COUPLING NUT

Ewald C. Thomsen, Kenosha, Wis.

Application July 5, 1940, Serial No. 344,019

3 Claims. (Cl. 285—143)

This invention relates to pipe fittings and the like and more particularly to couplings for pipe or hose connections.

The principal object of the invention is the provision of a simple coupling employing a nut on one of a pair of coupling members and a flanged member on a companion coupling member with formations on the nut adapted to have the flange slid or worked transversely with a slight rocking movement into the formations on the nut when the members are coupled together, thereby obviating the necessity for completely unscrewing the nut or fitting the nut over one of the pipe members before threading the same onto the other member.

Viewed from another aspect, it is an object of the invention to provide a quick coupling device for pipe or hose connections and especially, though not necessarily, flexible couplings, the coupling including a full threaded nut for one coupling member and a flanged portion on a complementary coupling member adapted to interfit in cut-away or slotted portions on the nut by lateral movement relative thereto so that the nut need not be completely unscrewed to loosen or tighten the coupling.

Another and more particular object is the provision of a coupling device including a full threaded nut provided with diametrically opposite posts or projections extending in the direction of the axis of the pipe or hose and each provided with a groove portion adapted to receive the ferrule or flange on a complementary coupling member by movement of the flange portion laterally or transversely of the nut between the posts and into the slotted portions thereof.

Other objects, advantages and novel aspects of the invention reside in certain details of construction as well as the cooperative relationship of the component parts of the illustrative embodiment described hereinafter in view of the annexed drawing, in which.

Figure 2:
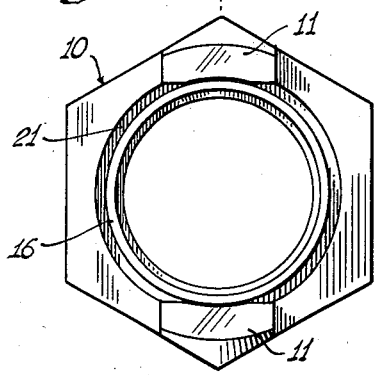
Fig. 2 is an end elevation of the coupling of Fig. 1.
Figure 1:
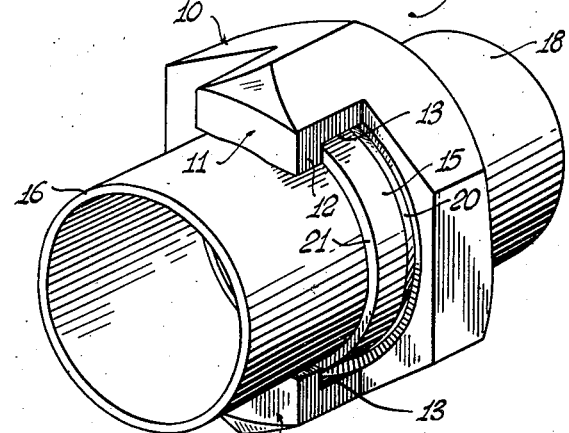
Fig. 1 is a perspective view of the complementary coupling members in interfitted relation.
Figure 3:
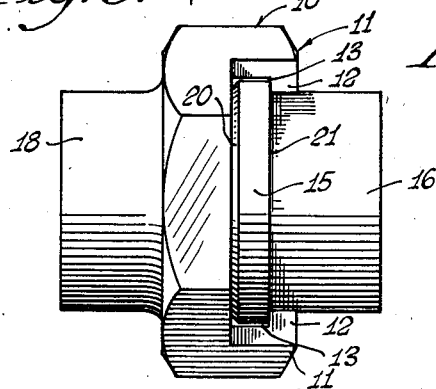
Fig. 3 is a side elevation of the coupling of Fig. 1.

As viewed in Fig. 1, a preferred embodiment of the coupling includes a hexagonal coupling nut 10 provided with a full interior thread 10' (Fig. 4), and at one axial end of the nut is disposed a pair of opposite axially extending posts or projections 11, each having a radially directed projection 12 constituting a coupling finger. In other terms, each of the posts 11 may be said to be undercut as at 13 to provide arcuate grooves adapted to receive the flange 15 on a companion coupling member or ferrule 16.

Figure 4:
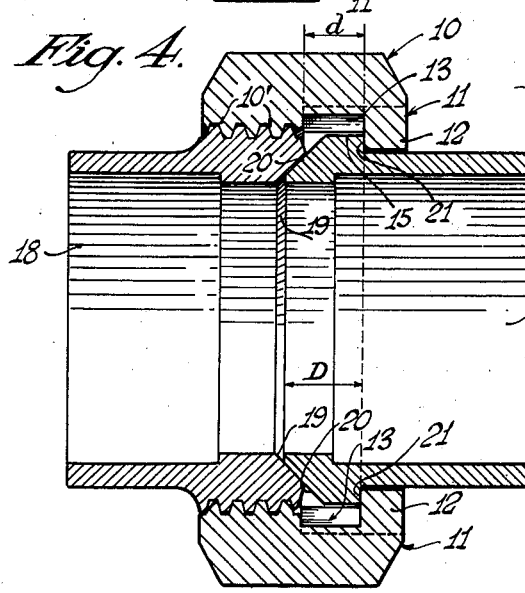
Fig. 4 is a vertical section along lines 4—4 of Fig. 2, to enlarged scale.

As shown in Fig. 4, the nut 10 is threaded upon a main coupling nipple 18 provided with a beveled mouth 19 against which the beveled end portion 20 of the ferrule 16 is pressed tightly in sealing engagement when the nut 10 is turned up, the projections 12 on the posts bearing firmly against the circumferential shoulder 21 on the flange of the ferrule for this purpose.

The lateral width of the coupling posts, that is, the width across the projections 12 in a direction transversely of the pipe or hose, is sufficient to insure a maximum of structural rigidity and at the same time permit the flange portion 15 on the ferrule to be worked sidewise into the groove portions 13.

Figure 5:
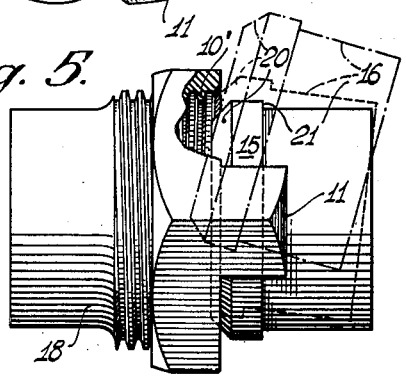
Fig. 5 is a top plan view of the coupling of Fig. 1 with portions of the nut cut away.

A feature of the invention relates to the construction of the flange 15 and the beveled end portion 20 on the ferrule or companion coupling member by virtue of which it is necessary to slide the ferrule at an angle with a sort of rocking motion into the slots 13 in the posts, as illustrated by the dotted and dash-dot lines of Fig. 5. As shown in Fig. 4, the distance D between the outer peripheral extremity of the beveled end of the ferrule and the innermost extremity of the flange 21 of the ferrule, is greater than the depth $d$ of the groove 13 in the posts. In consequence of this, the flange 15 on the ferrule cannot be slipped by direct lateral movement into the grooves between the posts, but must be rocked in the manner of the dotted-line showing in Fig. 5.

The advantage flowing from the foregoing peculiarities of the coupling structure resides in the fact that the threading on the nipple 18 need not be very long, to provide for firm engagement with the threading on the nut when the nut is turned up to draw the ferrule into the nipple. In other terms, the clearance between the ferrule and the groove portions in the posts is reduced so that the nut need not be tightened as far as would be the case where the ferrule is slipped by direct lateral movement into a socket portion, as in the case of coupling nuts known in the prior art.

Figure 6:
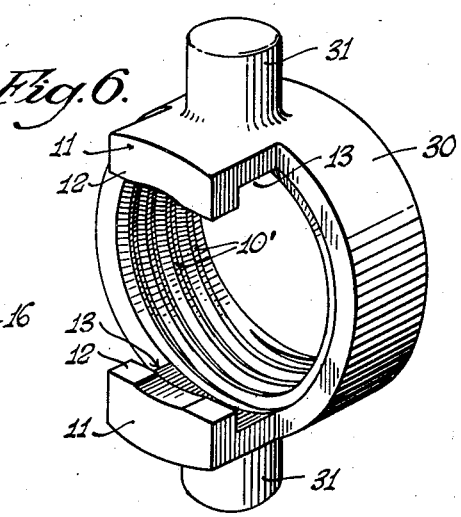
Fig. 6 is a perspective of a modification of the nut to include wrench studs.

The showing of Fig. 6 illustrates the application of the invention to a circular nut 30 provided with opposite radially projecting wrench posts or studs 31.

The improved structure of the coupling nut utilizing opposite arcuately grooved posts makes it possible to manipulate the coupling from either side, and the nut need be loosened only about one and one-half turns to free the ferrule so that it may be rocked loose where the device is used with relatively flexible or movable piping or hose. Where rigid pipe is employed, the coupling nut may be turned entirely off the nipple and onto the ferrule. The improved coupling is therefore quickly and easily manipulated both as to inserting and withdrawing the coupling members and in turning up or loosening the coupling nut, the structure at the same time having more than adequate strength for all types of installation or application.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. In a coupling of the class described including a nipple and a ferrule adapted to be drawn end to end in coupled engagement, the combination of a nut threadable onto the nipple and having opposite post portions provided with opposite grooves extending in a generally circumferential direction, each of said grooves including a marginal projection extending in a direction radially inward of the nut, said ferrule having a flange portion spaced inwardly from the end of said ferrule which engages the nipple, and in an axial direction from said end, on the ferrule, a distance which is greater than the depth of said grooves measured in a direction axially of said nut such that the flange portion on the ferrule is of too great a depth to be inserted by direct lateral movement in between the posts into the groove portions therein but must be rocked in between said posts at an angle, whereby the turning movement of the nut necessary to draw the ferrule into engagement with the nipple is reduced.

2. In a coupling of the class described including complementary conduit members adapted to be drawn end to end in coupled engagement, a nut threadable onto a first one of said members, said nut having diametrically opposite post portions at an axial end thereof remote from said first-mentioned conduit member, each of said post portions having a groove extending in a generally circumferential direction relative to the threading on the nut, the remaining conduit member having a circumferentially extending shoulder adjacent the end thereof which interfits with the first-mentioned conduit member, which shoulder portion is spaced inwardly in the direction of the length of said remaining conduit member from said end of the latter which engages the first-mentioned conduit member by a distance greater than the depth of the grooves in the post portions measured in the same direction, such that said remaining conduit member must be tilted sidewise between said grooves in the post portions, whereby less take-up is required on the nut in order to urge said conduit members into coupled relationship.

3. A coupling comprising a nut having a pair of oppositely disposed projections with grooves formed on their inner axial wall, a nipple having a beveled mouth formed in the threaded end thereof and adapted to threadably engage said nut, a ferrule provided with a flanged end portion terminating into a beveled surface, said flanged end and beveled surface being adapted to extend into said nut a distance greater than the width of said grooves and being rockingly insertable into such position with the flanged end portion in said grooves whereby a minimum threading movement of the nut is required to draw said beveled mouth and beveled surface into sealed relation.

EWALD C. THOMSEN.